United States Patent

[11] 3,581,471

| [72] | Inventor | Logan C. Waterman |
| | | Houston, Tex. |
| [21] | Appl. No. | 822,629 |
| [22] | Filed | May 7, 1969 |
| [45] | Patented | June 1, 1971 |
| [73] | Assignee | Petrolite Corporation |
| | | St Louis, Mo. |

[54] INCLINED WET-OIL HEATER-TREATER
9 Claims, 3 Drawing Figs.

[52] U.S. Cl. .................................................. 55/175
[51] Int. Cl. ................................................ B01d 19/00
[50] Field of Search ...................................... 55/36, 45, 159, 171, 174, 175, 195, 208; 210/71, 72, 83, 84, 180, 183, 187, 188, 256

[56] References Cited
UNITED STATES PATENTS

| 2,179,131 | 11/1939 | Millard | 210/187X |
| 2,326,384 | 8/1943 | Mount | 210/187X |
| 2,656,925 | 10/1953 | Johnson | 210/187 |
| 2,863,522 | 12/1958 | Smith | 55/171 |

Primary Examiner—Samih N. Zaharna
Assistant Examiner—R. W. Burks
Attorney—Harris, Kiech, Russell & Kern ABSTRACT: A nonelectric treater for resolving water-in-oil dispersions by the application of heat. The treater includes: an inclined elongated container providing a water zone at its lower end, an elongated oil zone intermediate its ends and a gas zone at its upper end; a wet-oil inlet tube in an extending axially of the container from its upper end and provided with port means communicating with the annulus between the inlet tube and the container; a heater tube within and extending axially of the inlet tube and extending axially through the container from its lower end to its upper end; a burner assembly connected to the lower end of the heater tube; supports for the heater tube capable of accommodating differential thermal expansion of the heater tube and the inlet tube or the container in the axial direction; and an annular dry-oil collector encircling and carried by the inlet tube within and adjacent the upper end of the oil zone.

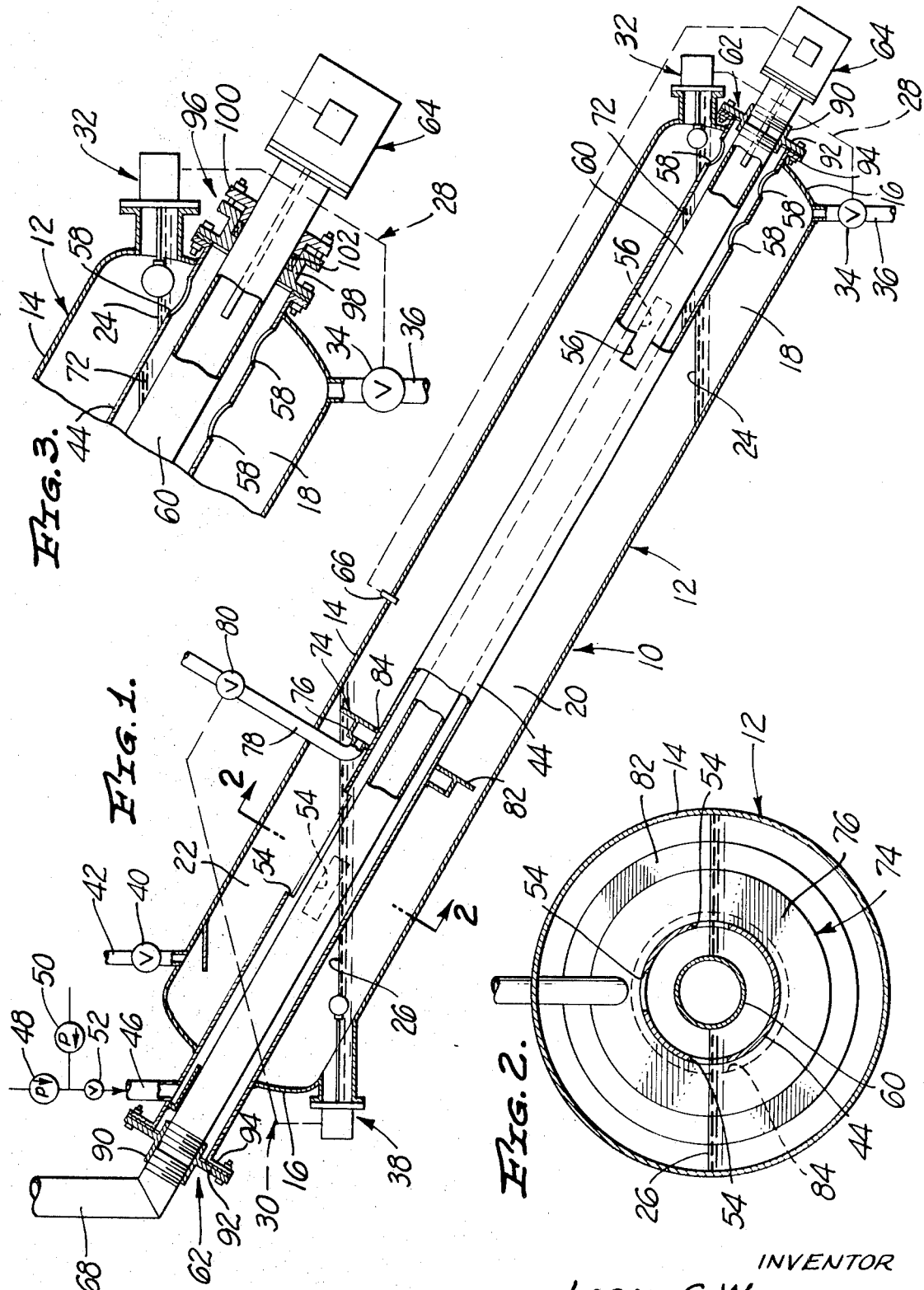

3,581,471

INCLINED WET-OIL HEATER-TREATER

BACKGROUND OF INVENTION

The present invention relates in general to heat resolution of emulsions of the type in which the continuous phase may be any desired liquid hydrocarbon, such as crude oil. The dispersed phase is normally aqueous and may be liquid, or it may be semiliquid and composed in parts of solids. Emulsions or dispersions to which the invention is applicable may be naturally occurring, or they may be the result of prior processing.

CROSS-REFERENCE TO RELATED APPLICATION

This application is related to my copending application SERIAL No. 822,604 filed May 7 1969, and entitled "Inclined, Electric Wet-Oil Treater."

SUMMARY AND OBJECTS OF INVENTION

In general, the invention contemplates, and a basic object thereof is to provide, an inclined wet-oil heater-treater which includes: an inclined elongated container providing a water zone at its lower end, and oil zone intermediate its ends and a gas zone at its upper end, the container being inclined at a relatively small angle to the horizontal to provide large-area interfaces, or interfacial regions, between the oil zone and the water and gas zones; a wet-oil inlet tube in and extending axially of the container from its upper end and provided with port means communicating with annulus between the inlet tube and the container; a heater tube within and extending axially of the inlet tube and extending axially through the container from its lower end to its upper end; heating means for flowing a heating medium upwardly through the heater tube; and dry-oil collector means within the oil zone. The invention further contemplates providing such a heater-treater having water and gas level control means respectively maintaining a predetermined upper water level in the water zone and a predetermined lower gas level in the gas zone, and means for drawing off dehydrated oil.

An important feature of the present invention resides in the counterflow relationship between the incoming wet oil and the heating medium inherent in the foregoing construction, it being noted that the incoming wet oil flows downwardly through the wet-oil inlet tube while the heating medium flows upwardly through the heater tube. This counterflow relationship is important because my water-oil emulsion body in the inlet tube is thus located in the annulus between the heater tube and the inlet tube close to the region of the highest temperature of the heating medium. This promotes thermal resolution of the emulsion, which is an important feature.

Another desirable feature of the foregoing construction is that free water accompanying the oil need not come in direct contact with the heater tube, but will flow down the trough formed by the bottom of the inlet tube. Gas evolved in the inlet tube will flow up the annulus between the heater tube and the inlet tube in the inverted trough formed by the top of the inlet tube. Thus, settling in the main body of the container, i.e., externally of the inlet tube, is undisturbed by gas or free water, which is an important feature.

Another object of the invention is to provide the inlet tube with ports adjacent its lower end and within the oil and water zones and adjacent its upper end at the interface between the oil and gas zones. Should production of oil be intermittent, this port arrangement provides for gentle thermal siphon flow and uniform heating of oil from the wet bottom section of the treater to the settling space at the top.

Another and important object of the invention is to provide means for accommodating differential thermal expansion of the heater tube and the container in the axial direction. Related objects in connection with different embodiments of the invention are to provide an expansion-accommodating means which includes a flexible annular plate having its inner periphery connected to the heater tube at one end thereof and having its outer periphery connected to the container, and to provide an expansion-accommodating means which includes an axially slidable connection between the container and the heater tube at one end thereof.

Still another object is to provide an annular dry-oil collector encircling and carried by the inlet tube adjacent the upper end of and within the oil zone, the collector providing an annular dry-oil outlet bounded by and encircling the inlet tube. With this construction, the dry-oil collector damps any hydraulic disturbances that might be transferred from the gas zone to the oil zone. Also, the narrow outlet annulus around the inlet tube operates with a skimming action to promote a uniform withdrawal of clean oil form throughout the settling zone.

The foregoing objects, advantages, features and results of the present invention, together with various other objects, advantages, features and results thereof which will be evident to those skilled in the heater-treater art in the light of this disclosure, may be achieved with the exemplary embodiments of the invention described in detail hereinafter and illustrated in the accompanying drawing.

DESCRIPTION OF DRAWING

In the drawing:

FIG. 1 is a longitudinal sectional view of an inclined wet-oil heater-treater which embodies the invention;

FIG. 2 is an enlarged, transverse sectional view taken as indicated by the arrowed line 2—2 of FIG. 1; and FIG. 3 is an enlarged, fragmentary longitudinal sectional view similar to the lower end of FIG. 1, but illustrating another embodiment of the invention.

DESCRIPTION OF EXEMPLARY EMBODIMENTS OF INVENTION

The inclined wet-oil heater-treater of the invention is designated generally by the numeral 10 and includes an elongated container or tank 12 which is inclined at an angle to the horizontal which is preferably in the range of 15° to 60°. The container 12 comprises an elongated cylindrical shell 14 closed at its ends by heads 16.

The container 12 provides a water zone 18 at its lower end, and elongated oil zone 20 intermediate its ends, and a gas zone 22 at its upper end. The oil zone is separated from the water and gas zones by large-area interfaces 24 and 26 because of the relatively small angle of inclination of the container 12.

The heater-treater 10 includes water and gas level control means 28 and 30 for controlling the levels of the interfaces 24 and 26. More particularly, the water level control means 28 prevents the oil-water interface 24 from rising above a predetermined upper level, and the gas level control means 30 prevents the gas-oil interface 26 from falling below a predetermined level.

The water level control means 28 is shown simply as comprising a float actuated means 32 for opening a valve 34 in a water outlet line 36 whenever the water level becomes too high. Similarly, the gas level control means 30 includes float-actuated means 38 for closing a valve 80 in an oil outlet line 78 whenever the upper level of the oil in the oil zone 20 falls to low. A back pressure valve 40 is disposed in a line 42 communicating with the gas zone 22.

A wet-oil inlet tube 44 extends axially through the container 12, being welded, or otherwise secured, to the end heads 16. The wet oil to be treated enters the inlet tube 44 at its upper end through an inlet line 46. The dispersion to be treated may be obtained from any suitable source, or it may result from mixing oil from a pump 48 and a reagent from a pump 50 in a mixer 52. For example, the pump 50 may deliver a demulsifying agent, or any other desired material.

The inlet tube 44 is provided with port means communicating with the annulus between the inlet tube and the shell 14 of the container 12. More particularly, this port means includes elongated axially extending slots 54 at the gas-oil interface to admit gas into the gas zone 22. The inlet tube 44 is also provided with elongated axially extending slots 56 within and adjacent the lower end of the oil zone 20 for the passage of oil from the interior of the inlet tube into the oil zone. The inlet tube 44 is also provided within the water zone 19 with openings 58 which permit water to flow from the interior of the inlet tube 44 into the water zone.

The heater-treater 10 includes a heater tube 60 within and extending axially of the inlet tube 44 and extending axially through the container 12 form one end thereof to the other. Supports 62, which will be described in more detail hereinafter, connect the upper and lower ends of the heater tube 60 to the upper and lower ends of the inlet tube 44, the latter, in turn, being welded to the end heads 16 of the container 12.

Connected to the lower end of the heater tube 60 is a suitable heating means 64 for flowing a heating medium upwardly through the heater tube. Preferably, the heating means 64 is an oil or gas burner assembly which discharges its products of combustion into the lower end of the heater tube 60, this burner assembly being controlled by a thermostat 66 exposed to the temperature in the oil zone 20 adjacent the upper end thereof. A stack 68 is connected to the upper end of the heater tube 60.

Wet oil entering the upper end of the inlet tube 44 through the inlet line 46 is prevented from impinging directly on the upper end of the heater tube 60 by a splash plate 70 suitably secured to the inlet tube.

It will be noted that there is a counterflow relationship between the downwardly flowing wet oil in the inlet tube 44 and the upwardly flowing products of combustion in the heater tube 60. This is important because it results in the exposure of any "intermediate" emulsion layer or emulsion body 72 in the inlet tube 44, adjacent the oil-water interface 24, to substantially the maximum temperature produced by the burner assembly 64. This promotes resolution of the emulsion in the body 72, which is an important feature.

Another feature of the counterflow relationship between the incoming liquid and the heating medium is that free water accompanying the oil need not come in direct contact with the heater tube 60. Instead, it drains downwardly in the trough formed by the bottom of the inlet tube 44, escaping into the water zone 18 through the openings 58. Also, gas evolved in the inlet tube 44 flows upwardly in the inverted trough formed by the top of the inlet tube, escaping into the gas zone 22 through the slots 54. Oil, of course, escapes into the oil zone 20 through the slots 56. Thus, settling in the main body of the container 12 is undisturbed by gas or free water, which is an important feature of the invention.

Should production of oil be intermittent, the slots 54 and 56 in the inlet tube 44 provide for gentle thermosiphon flow and uniform heating of oil from the wet bottom section of the treater to the settling space at the top thereof.

An annular dry-oil collector 74 encircles and is carried by the inlet tube 44 within the oil zone 20 adjacent the upper end thereof. The collector 74 includes an annular dry-oil collecting chamber 76 having connected thereto the outlet line 78 extending through the container shell 14 and controlled by the valve 80. The annular chamber 76, which is welded, or otherwise secured, to the inlet tube 44, is formed in part by an annular plate 82 which is spaced outwardly slightly form the inlet tube 44 to provide an annular dry-oil outlet 84 bounded by and encircling the inlet tube. The annular outlet 84 faces downwardly along the inlet tube 44.

The dry-oil collector 74, by partially blocking the annulus between the inlet tube 44 and the container shell 14 adjacent the upper end of the oil zone 20, damps any hydraulic disturbances that might tend to be transferred between the oil and gas zone 20 and 22. The narrow annular outlet 84 operates with a skimming action to promote uniform withdrawal of clean oil form the upper end of the oil zone 20.

Considering another aspect of the present invention, in order to permit easy replacement of the heater tube 60 in the field from existing stocks, the heater tube is preferably simply a pipe cut to the necessary length. In the construction shown in FIG. 1, the ends of the pipe are simply threaded into couplings 90 which respectively threadedly receive the burner assembly 64 and the stack 68. The couplings 90 are provided with external annular flanges 92 which are bolted, or otherwise secured, at their outer peripheries to annular flanges 94 on the ends of the inlet tube 44. The flanges 92 and 94 are relatively thin and considerably larger than the inlet tube 44 so that they are capable of flexing axially to accommodate any differential thermal expansion of the heater tube relative to the inlet tube (and relative to the container 12) in the axial direction. Thus, the supports 62 provide a very simple and effective means of accommodating differential thermal expansion.

Turning to FIG. 3, Illustrated therein is an alternate heater-tube support 96 which comprises a collar 98 bolted, or otherwise secured, to the adjacent end of the inlet tube 44. A second collar 100 axially outwardly of the collar 98 is slidable axially of the heater tube 60 to compress packing 102 against the heater tube, there being a nut and bolt connection between the two collars 98 and 100 for the purpose of adjusting the packing 102. With this construction, differential thermal expansion of the heater tube 60 relative to the inlet tube 44, and the container 12, in the axial direction is accommodated by movement of the heater tube relative to the collars 98 and 100 and the packing therebetween.

Although I have disclosed exemplary embodiments of my invention herein for purposes of illustration, it will be understood that various changes, modifications and substitutions may be incorporated in such embodiment.

I claim as my invention:

1. In an inclined wet-oil heater-treater, the combination of:
   a. an inclined elongated container providing a water zone at its lower end and an oil zone above its lower end;
   b. a wet-oil inlet tub in and extending axially of said container and provided with port means communicating with the annulus between said inlet tube and said container adjacent the upper and lower ends of said oil zone;
   c. a heater tube within and extending axially of said inlet tube; and
   d. dry-oil collector means adjacent the upper end of and within said oil zone.

2. In an inclined wet-oil heater-treater, the combination of:
   a. an inclined elongated container providing a water zone at its lower end, and oil zone intermediate its ends and a gas zone at its upper end;
   b. a wet-oil inlet tube in and extending axially of said container from its supper end and provided with port means communicating with the annulus between said inlet tube and said container adjacent the interfaces between said oil ad water zones and said oil and gas zones;
   c. a heater tube within and extending axially of said inlet tube and extending axially through said container from one end thereof to the other;
   d. heating means for flowing a heating medium axially through said heater tube; and
   e. dry-oil collector means adjacent the upper end of and within said oil zone.

3. An inclined heater-treater as defined in claim 2 wherein said inlet tube is provided with a wet-oil inlet at its upper end and wherein said heating means is located at the lower end of said heater tube and flows a heating medium upwardly through said heater tube to achieve counterflow to the wet oil and the heating medium.

4. An inclined heater-treater according to claim 3 wherein said heating means comprises burner for flowing products of combustion upwardly through said heater tube.

5. An inclined heater-treater as set forth in claim 2 including means for accommodating differential thermal expansion of said heater tube and said container in the axial direction.

6. An inclined heater-treater according to claim 5 wherein said expansion-accommodating means includes a flexible annular plate having its inner periphery connected to said heater tube at one end thereof and having its outer periphery connected to said inlet tube.

7. An inclined heater-treater as defined in claim 5 wherein said expansion-accommodating means includes an axially slidable connection between said inlet tube and said heater tube at one end thereof.

8. An inclined heater-treater as set forth in claim 2 including an annular dry-oil collector encircling and carried by said inlet tube adjacent the upper end of and within said oil zone, said collector providing an annular dry-oil outlet bounded by and encircling said inlet tube.

9. An inclined heater-treater according to claim 2 wherein said inlet tube is provided with ports adjacent its lower end and within said oil and water zones and adjacent its upper end and at the interface between said oil and gas zones.